United States Patent
Nie et al.

(10) Patent No.: US 12,242,286 B1
(45) Date of Patent: Mar. 4, 2025

(54) METHOD, SYSTEM, AND DEVICE FOR GLOBAL PATH PLANNING FOR UNMANNED VEHICLE IN OFF-ROAD ENVIRONMENT

(71) Applicant: Beijing Institute of Technology, Beijing (CN)

(72) Inventors: Shida Nie, Beijing (CN); Yujia Xie, Beijing (CN); Zhihao Liao, Beijing (CN); Hui Liu, Beijing (CN); Lijin Han, Beijing (CN); Congshuai Guo, Beijing (CN)

(73) Assignee: Beijing Institute of Technology, Beijing (CN)

( * ) Notice: Subject to any disclaimer, the term of this patent is extended or adjusted under 35 U.S.C. 154(b) by 0 days.

(21) Appl. No.: 18/808,657

(22) Filed: Aug. 19, 2024

(30) Foreign Application Priority Data

Jan. 15, 2024 (CN) .......................... 202410052091.7

(51) Int. Cl.
G06V 10/50 (2022.01)
G05D 1/246 (2024.01)
(Continued)

(52) U.S. Cl.
CPC .......... G05D 1/2469 (2024.01); G05D 1/644 (2024.01); G06V 10/50 (2022.01); G06V 20/13 (2022.01); G05D 2107/30 (2024.01)

(58) Field of Classification Search
CPC ...... G05D 1/2469; G05D 1/644; G06V 20/13; G01C 21/30; G01C 21/32; G01C 21/34; G06Q 10/047
(Continued)

(56) References Cited

U.S. PATENT DOCUMENTS

| 8,577,538 B2 * | 11/2013 | Lenser ................. G05D 1/0027 701/28 |
| 2005/0116951 A1 * | 6/2005 | Stephenson ............. G06T 15/06 345/424 |

FOREIGN PATENT DOCUMENTS

| AU | 2011235939 A1 * | 5/2012 | .......... G05D 1/0231 |
| CN | 110675307 A * | 1/2020 | ............. G01C 11/04 |

(Continued)

OTHER PUBLICATIONS

전찬우 "Development of Complete Path Planning and Tracking Control Technologies for Autonomous Paddy field Tillage and Pudling. Leveling Operations." PhD diss., 서울대학교 대학원, (Year:2022).*

(Continued)

*Primary Examiner* — Cuong H Nguyen
(74) *Attorney, Agent, or Firm* — Nields, Lemack & Frame, LLC

(57) ABSTRACT

Provided are a method, system and device for global path planning for an unmanned vehicle in an off-road environment. The method includes: obtaining satellite elevation data and a satellite remote sensing image of a current off-road environment; constructing a digital elevation model (DEM); determining slope and land surface relief of each grid in the current off-road environment; performing gray processing on the satellite remote sensing image to obtain grayscale values of the grids; determining traversal costs of the grids corresponding to different ground types; constructing a global grid map based on the slope and the land surface relief of each grid, as well as the traversal costs corresponding to the different ground types; determining a rugged terrain potential field and path costs; and searching for paths using a Bresenham's line algorithm and Theta* algorithm (Continued)

based on the rugged terrain potential field and the path costs, to generate a global path.

12 Claims, 4 Drawing Sheets

(51) Int. Cl.
    *G05D 1/644*     (2024.01)
    *G06V 20/13*     (2022.01)
    *G05D 107/30*     (2024.01)

(58) Field of Classification Search
    USPC .......................................................... 701/410
    See application file for complete search history.

(56) References Cited

FOREIGN PATENT DOCUMENTS

| | | | | | |
|---|---|---|---|---|---|
| CN | 113048981 | A | * | 6/2021 | ............. G01C 21/20 |
| CN | 113791617 | A | * | 12/2021 | |
| CN | 113048981 | B | * | 11/2022 | ............. G01C 21/20 |
| CN | 115903826 | A | * | 4/2023 | ............. Y02T 10/00 |
| CN | 110675307 | B | * | 6/2023 | ............. G01C 11/04 |
| CN | 117146836 | A | * | 12/2023 | |
| EP | 3144885 | A1 | * | 3/2017 | ........... G06T 11/206 |
| RU | 2734115 | C2 | * | 10/2020 | ........... G02B 3/0056 |

OTHER PUBLICATIONS

Barrientos, Antonio, et al. "Aerial remote sensing in agriculture: A practical approach to area coverage and path planning for fleets of mini aerial robots." Journal of Field Robotics 28.5 (2011): 667-689.(Year: 2011).*

Stigenius, Erik. "Map Engine with Route and Slope Prediction for Autonomous Vehicles in Offroad Applications." (Year: 2017).*

Barrientos, Antonio, et al. "Aerial remote sensing in agriculture: A practical approach to area coverage and path planning for fleets of mini aerial robots." Journal of Field Robotics 28.5 : 667-689 (Year: 2011).*

* cited by examiner

| 91 | 78 | 63 | 50 | 53 | 63 | 44 | 55 | 43 | 25 |
|----|----|----|----|----|----|----|----|----|----|
| 94 | 81 | 64 | 51 | 57 | 62 | 50 | 60 | 50 | 35 |
| 100 | 84 | 66 | 55 | 64 | 66 | 54 | 65 | 57 | 42 |
| 103 | 84 | 66 | 56 | 72 | 71 | 58 | 74 | 65 | 47 |
| 96 | 82 | 66 | 63 | 80 | 78 | 60 | 84 | 72 | 49 |
| 91 | 79 | 66 | 66 | 80 | 80 | 62 | 86 | 77 | 56 |
| 86 | 78 | 68 | 69 | 74 | 75 | 70 | 93 | 82 | 57 |
| 80 | 75 | 73 | 72 | 68 | 75 | 86 | 100 | 81 | 56 |
| 74 | 67 | 69 | 74 | 62 | 66 | 83 | 88 | 73 | 53 |
| 70 | 56 | 62 | 74 | 57 | 58 | 71 | 74 | 63 | 45 |

METHOD, SYSTEM, AND DEVICE FOR GLOBAL PATH PLANNING FOR UNMANNED VEHICLE IN OFF-ROAD ENVIRONMENT

CROSS REFERENCE TO RELATED APPLICATION

This patent application claims the benefit and priority of Chinese Patent Application No. 202410052091.7, filed with the China National Intellectual Property Administration on Jan. 15, 2024, the disclosure of which is incorporated by reference herein in its entirety as part of the present application.

TECHNICAL FIELD

The present disclosure relates to the field of global planning for unmanned vehicles, and in particular to a method, system and device for global path planning for an unmanned vehicle in an off-road environment.

BACKGROUND

In recent years, there have been numerous reliable path planning solutions for autonomous driving in urban environments. However, there is a lack of mature path planning solutions for off-road environments. Automated driving path planning methods for urban environments generally do not consider the impact of terrain factors. Unmanned vehicles inevitably face complex terrain and dense obstacles in off-road environments, making it crucial to consider terrain factors for reliable and efficient path planning. This is also an important prerequisite for ensuring safe driving of vehicles. Currently, the commonly used algorithm in global path planning is A*, but it has issues such as high computational complexity, high memory usage, while common grid information typically lacks ground type information and elevation information, resulting in poor performance in off-road environments.

Therefore, there is an urgent need for a new global path planning method for unmanned vehicles in off-road environments that fully considers the impact of terrain factors in off-road environments. This new method aims to plan paths with minimal slopes and rugged terrain, thereby improving efficiency of vehicle movement in off-road environments.

SUMMARY

An objective of the present disclosure is to provide a method, system, and device for global path planning for an unmanned vehicle in an off-road environment, to enhance the efficiency of vehicle movement in the off-road environment.

To achieve the above objective, the present disclosure provides the following solution: A method for global path planning for an unmanned vehicle in an off-road environment, including: obtaining satellite elevation data and a satellite remote sensing image of a current off-road environment;
  constructing a digital elevation model (DEM) based on the satellite elevation data;
  determining slope and land surface relief of each grid in the current off-road environment based on the DEM;
  performing gray processing on the satellite remote sensing image to obtain grayscale values of the grids;
  determining traversal costs of the grids corresponding to different ground types based on the grayscale values of the grids;
  constructing a global grid map based on the slope and the land surface relief of each grid, as well as the traversal costs corresponding to the different ground types;
  determining a rugged terrain potential field and path costs based on the global grid map; and
  searching for paths using a Bresenham's line algorithm and Theta* algorithm based on the rugged terrain potential field and the path costs, to generate a global path.

Optionally, said determining the slope and the land surface relief of each grid in the current off-road environment based on the DEM specifically includes: determining the slope of each grid in the current off-road environment using a third-order unweighted difference model;
  calculating a mean square deviation of elevation in a local area based on the DEM; and
  determining a mean square deviation of an i-th grid, which serves as land surface relief of the i-th grid, based on the mean square deviation of elevation in the local area as well as an elevation value of the i-th grid.

Optionally, said performing gray processing on the satellite remote sensing image to obtain the grayscale values of the grids specifically includes: obtaining the grayscale values of the grids using an arithmetic mean method based on the satellite remote sensing image.

Optionally, said determining the traversal costs of the grids corresponding to the different ground types based on the grayscale values of the grids includes: determining the traversal costs of the grids corresponding to the different ground types using the following formula:

$$\text{pass}_m = \text{pass}_1 \cdot \frac{v_1}{v_m} (m = 1, 2, 3)$$

pass represents a traversal cost of a grid; m represents a code corresponding to a ground type, with 1, 2, and 3 corresponding to hard soil roads, natural roads, and low mountain roads, respectively; and $v_m$ represents a maneuvering speed of a vehicle on a corresponding ground type.

Optionally, said searching for paths using the Bresenham's line algorithm and Theta* algorithm based on the rugged terrain potential field and the path costs, to generate the global path specifically includes: S1: calculating the slope based on the DEM, to initialize a slope table; calculating a repulsive potential field based on the land surface relief, to initialize a Rep table; initializing a pass table based on the satellite remote sensing image; initializing grid status based on the ground type and the slope; initializing Openlist and Closelist, setting a start point and a target point, and adding the start point to the Openlist;
  S2: checking whether the Openlist is empty; if the Openlist is empty, stopping running; otherwise, starting pathfinding; and selecting a point with a minimum cost value currently in the Openlist as an expanded node;
  S3: checking whether a current expanded node n is the target point; if yes, finishing pathfinding, backtracking parent nodes of the node n, storing the backtracked nodes into a path table sequentially to generate a path, until the start point is reached; otherwise, expanding to 8 neighboring nodes surrounding the node n, removing the node n from the Openlist, and adding the node n to the Closelist;

S4: during expansion to a neighboring node n', first checking whether the grid status of the neighboring node n' is free or obstacle; if the grid status is obstacle, skipping the neighboring node n', and if the grid status is free, proceeding to S5; and S5: checking whether the neighboring node n' is in the Closelist; if yes, performing no operation; otherwise, calculating a cost value from the node n to the neighboring node n' and setting the node n as a parent node of the neighboring node n'; calculating a cost value between the neighboring node n' and a parent node of the node n, and if the cost value between the neighboring node n' and the parent node of the node n is smaller than a cost value between the parent node of the node n and the node n plus a cost value between the neighboring node n' and the node n, updating a cost value of the neighboring node n' and setting a parent node of the neighboring node n' as the parent node of the node n; then checking whether the neighboring node n' is in the Openlist; if not, adding the neighboring node n' to the Closelist; if the neighboring node n' is in the Openlist, comparing a previous cost value of the neighboring node n' with a newly calculated cost value; if the newly calculated cost value is smaller, updating the cost value of the neighboring node n'; otherwise, performing no operation; and then returning to S2.

A system for global path planning for an unmanned vehicle in an off-road environment is provided, including: a data obtaining module configured to obtain satellite elevation data and a satellite remote sensing image of a current off-road environment;

a DEM construction module configured to construct a DEM based on the satellite elevation data;

a slope and land surface relief determining module configured to determine slope and land surface relief of each grid in the current off-road environment based on the digital elevation model;

a gray processing module configured to perform gray processing on the satellite remote sensing image to obtain grayscale values of the grids;

a traversal cost determining module configured to determine traversal costs of the grids corresponding to different ground types based on the grayscale values of the grids;

a global grid map constructing module configured to construct a global grid map based on the slope and the land surface relief of each grid, as well as the traversal costs corresponding to the different ground types;

a rugged terrain potential field and path costs determining module configured to determine a rugged terrain potential field and path costs based on the global grid map; and a global path generating module configured to search for paths using a Bresenham's line algorithm and Theta* algorithm based on the rugged terrain potential field and the path costs, to generate a global path.

A device for global path planning for an unmanned vehicle in an off-road environment is provided, including at least one processor, at least one memory, and computer program instructions stored in the memory, where when the computer program instructions are executed by the processor, the method is implemented.

Optionally, the memory is a computer-readable storage medium.

According to specific embodiments of the present disclosure, the present disclosure has the following technical effects: In the method, system, and device for global path planning for an unmanned vehicle in an off-road environment provided by the present disclosure, a global grid map is constructed based on the slope and land surface relief of each grid, as well as traversal costs corresponding to different ground types. The global grid map can desirably express obstacle information and distances in the environment, and store elevation information of the environment. The slope and land surface relief of the environment are calculated using satellite elevation data in the grids, to determine the passability of the vehicle. In the present disclosure, the impact of terrain factors in the off-road environment on planning is quantified, such that the influence of the terrain in the off-road environment is better considered. A global path is generated by searching for paths using the Bresenham's line algorithm and Theta* algorithm based on the rugged terrain potential field and path costs; a cost function in an improved Theta* algorithm constructed based on the Bresenham's line algorithm and Theta* algorithm considers not only the variation in real distance between grids due to road slope but also the impact of different ground types on vehicle speed and the need for vehicles to stay away from rugged terrain as much as possible while driving. The method provided by the present disclosure can result in planned paths with fewer slopes and rugged terrains, thereby improving travel efficiency of vehicles in the off-road environment.

BRIEF DESCRIPTION OF THE DRAWINGS

To describe the technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

An objective of the present disclosure is to provide a method, system, and device for global path planning for an unmanned vehicle in an off-road environment, to enhance the efficiency of vehicle movement in the off-road environment.

In order to make the above objective, features and advantages of the present disclosure clearer and more comprehensible, the present disclosure will be further described in detail below in combination with accompanying drawings and particular implementation modes.

Figure 1:
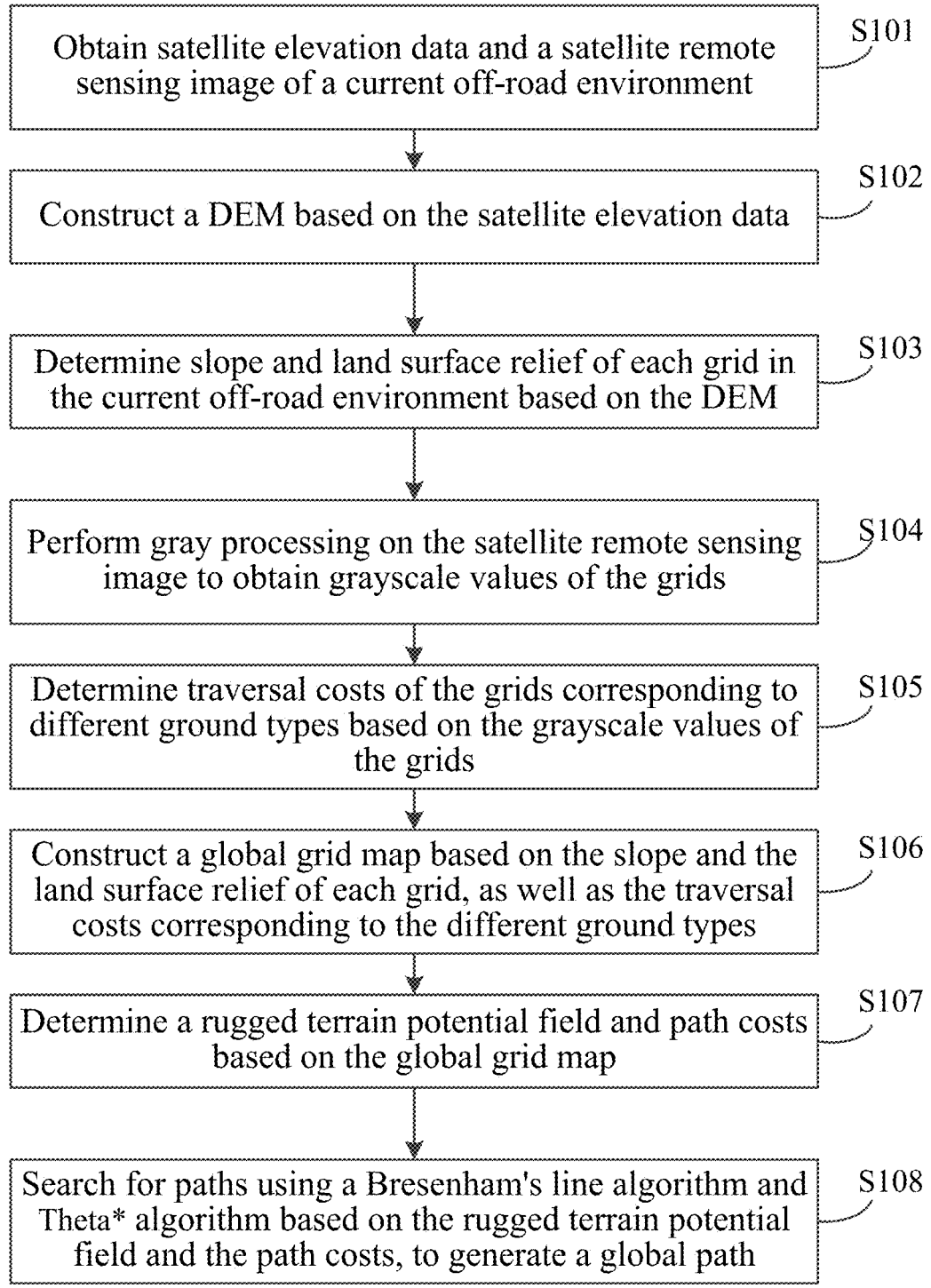
FIG. 1 is a schematic flowchart of a method for global path planning for an unmanned vehicle in an off-road environment according to the present disclosure.

As shown in FIG. 1, a method for global path planning for an unmanned vehicle in an off-road environment according to the present disclosure includes steps S101 to S108.

S101: Obtain satellite elevation data and a satellite remote sensing image of a current off-road environment.

The satellite elevation data can be expressed as a function: $V_i=(X_i, Y_i, Z_i)(i=1, 2, 3 \ldots n_g)$, where $X_i$ and $Y_i$ are plane coordinates; $Z_i$ is an elevation value corresponding to point $(X_i, Y_i)$; $n_g$ is a maximum value in sequence numbers representing grid positions in a grid map, and is an integer.

S102: Construct DEM based on the satellite elevation data.

Figures 2, 3:
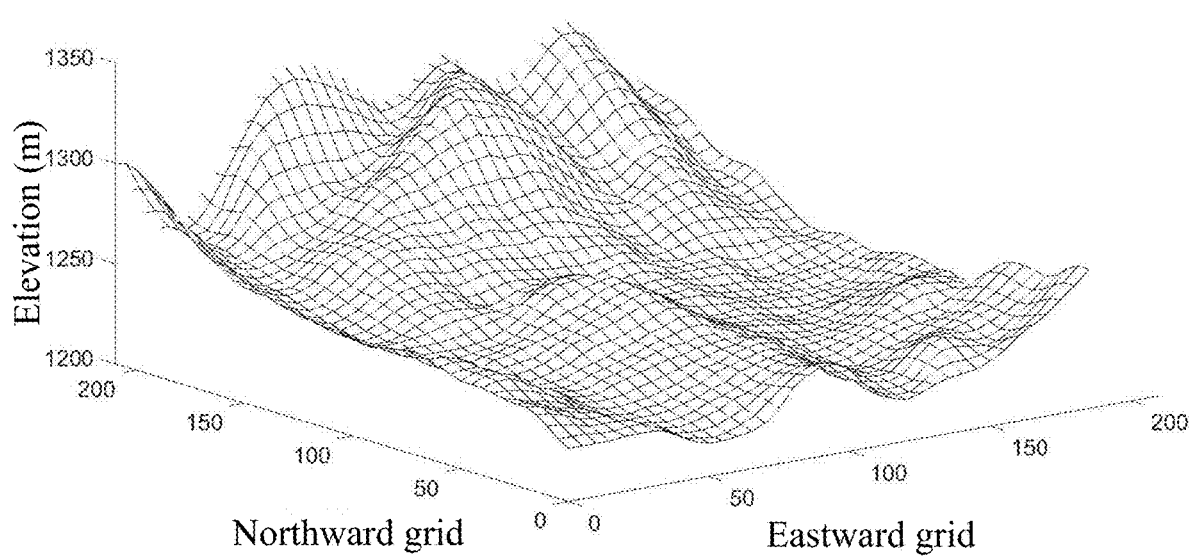
FIG. 2 is a schematic diagram of DEM grids.
FIG. 3 is an elevation map of an off-road environment.

The sampling principle is regular grid sampling, and the elevation values corresponding to the grids are stored, as shown in FIG. 2. An off-road environment elevation map can be created based on the elevation data, as shown in FIG. 3.

S103: Determine slope and land surface relief of each grid in the current off-road environment based on the DEM.

S103 specifically includes: determining the slope of each grid in the current off-road environment using a third-order unweighted difference model;

calculating a mean square deviation of elevation in a local area based on the DEM; and determining a mean square deviation of an i-th grid based on the mean square deviation of elevation in the local area as well as an elevation value of the i-th grid, and using the mean square deviation of the i-th grid as land surface relief of the i-th grid.

Figures 4, 5:
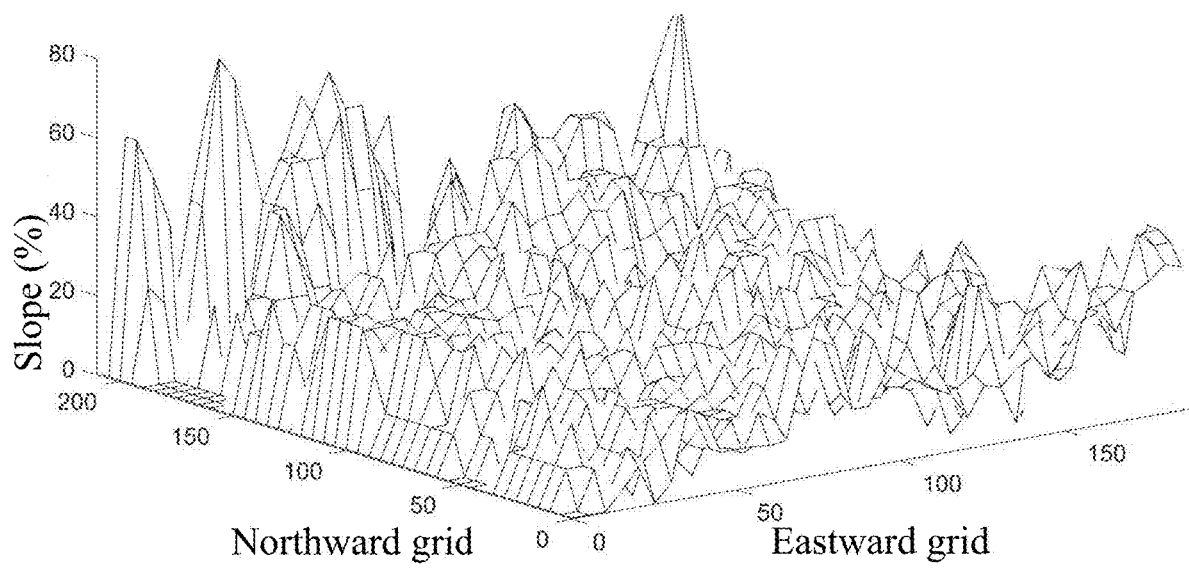
FIG. 4 is a schematic diagram of a moving window.
FIG. 5 is a slope map of an off-road environment.

In the DEM model where elevation is discrete and the terrain surface is unknown, slope and aspect calculations are performed using a 33 sliding window method within a local range, as shown in FIG. 4. When a vehicle is in grid $Z_5$, the algorithm principles are as follows: $f_x=(Z_7-Z_1+Z_8-Z_2+Z_9-Z_3)/6g$ and $f_y=(Z_3-Z_1+Z_6-Z_4+Z_9-Z_7)/6g$. $f_x$ represents an elevation change rate in a north-south direction, $f_y$ represents an elevation change rate in an east-west direction, $Z_i$ represents elevation values of each grid, and g represents grid spacing.

The slope is calculated using the following method:

$$S = \sqrt{f_x^2 + f_y^2}.$$

The slope is typically expressed as percentages, where the slope is as follows:

$$S = \left(\sqrt{f_x^2 + f_y^2}\right) \times 100\%.$$

Considering the power performance of typical off-road vehicles, in the present disclosure, a slope threshold is set to 40%, and grids with slope above this threshold is defined as impassable.

By calculating the mean square deviation of elevation in a local area, the dispersion of elevation values in the local area is measured to assess the terrain ruggedness and evaluate the terrain relief characteristics of the area.

First, a geometric mean $\bar{h}$ of elevations in the area (3×3 sliding window) is calculated:

$$\bar{h} = \frac{\sum_{i=1}^{n} h_i}{n} \cdot h_i$$

represents an elevation value of the i-th grid, and n represents the number of grids.

Then, the mean square deviation of the i-th grid is calculated to determine the land surface roughness of the grid, providing land surface relief information $d_{roughness}$:

$$d_{roughness} = \sqrt{\frac{\sum_{i=1}^{n}(h_i - \bar{h})^2}{n-1}}.$$

S104: Perform gray processing on the satellite remote sensing image to obtain grayscale values of the grids.

In S104, the grayscale values of the grids are obtained using an arithmetic mean method based on the satellite remote sensing image. In the satellite remote sensing image, grids corresponding to different terrain properties have distinct pixel values. A grayscale value of a grid is calculated using the geometric mean method:

$$\text{Gray} = \left(\prod_i^{n_t} C_i\right)^{\frac{1}{n_t}} = (R \cdot G \cdot B)^{\frac{1}{3}} \cdot \text{Gray}$$

represents the grayscale value of the grid, $n_t$ represents the number of color channels in the image, i represents a sequence number of the grid, and $C_i$ represents an RGB value of a pixel.

S105: Determine traversal costs of the grids corresponding to different ground types based on the grayscale values of the grids.

In traditional grid maps, grids are either passable or impassable, which correspond to grid occupation states 1 and 0, respectively. During study on the passability of the off-road environment, a traversal coefficient $pass_i$ is defined for each grid based on the impact of different ground types in the off-road environment on vehicle passability. A larger value of $pass_i$ indicates that the terrain corresponding to the grid i is more difficult to pass, while a smaller value indicates that the terrain is easier to pass, as shown in FIG. 5.

Using the actual average driving speed of vehicles as a reference standard, the actual average driving speed in off-road environments is lower than an average driving speed on roads due to factors like soil quality, vegetation, and other terrain properties. Terrain properties in the off-road environment are classified into hard soil roads, natural roads, and low mountain roads, and vehicles are assigned a reference maneuvering speed in the off-road environment based on general off-road vehicle performance, as shown in Table 1.

TABLE 1

| Terrain property | Hard soil roads | Natural roads | Low mountain roads |
| --- | --- | --- | --- |
| Maneuvering speed | 40 | 12 | 6 |

Based on the maneuvering speed of vehicles in the off-road environment, using a passing speed of vehicles on hard soil roads as a benchmark, different terrain properties are assigned corresponding traversal cost values for vehicles. If a grid traversal cost corresponding to the hard soil roads is set to 10, the grid traversal cost can be represented as follows:

$$\text{pass}_m = \text{pass}_1 \cdot \frac{v_1}{v_m} (m = 1, 2, 3) \cdot \text{pass}$$

represents a traversal cost of a grid; m represents a code corresponding to a ground type, with 1, 2, and 3 corresponding to hard soil roads, natural roads, and low mountain roads, respectively; and $v_m$ represents a maneuvering speed of a vehicle on a corresponding ground type.

Traversal costs and grayscale values of grids corresponding to different ground types are as shown in Table 2.

TABLE 2

| No. | Terrain property | Traversal speed | Traversal cost | Grayscale value |
|---|---|---|---|---|
| 1 | Hard soil roads | 40 km/h | 10 | 15-30 |
| 2 | Natural roads | 12 km/h | 33 | 31-50 |
| 3 | Low mountain roads | 6 km/h | 67 | 50-85 |
| 4 | Lakes (obstacles) | 0 km/h | 99999 | 85-100 |

S106: Construct a global grid map based on the slope and the land surface relief of each grid, as well as the traversal costs corresponding to the different ground types.

S107: Determine a rugged terrain potential field and path costs based on the global grid map.

A Gaussian-like function is used to calculate a repulsive potential field:

$$U_{rep}(X) = A \cdot e^{\left(-\frac{d(X,X_0)^2}{2\sigma^2}\right)}.$$

Figure 6:
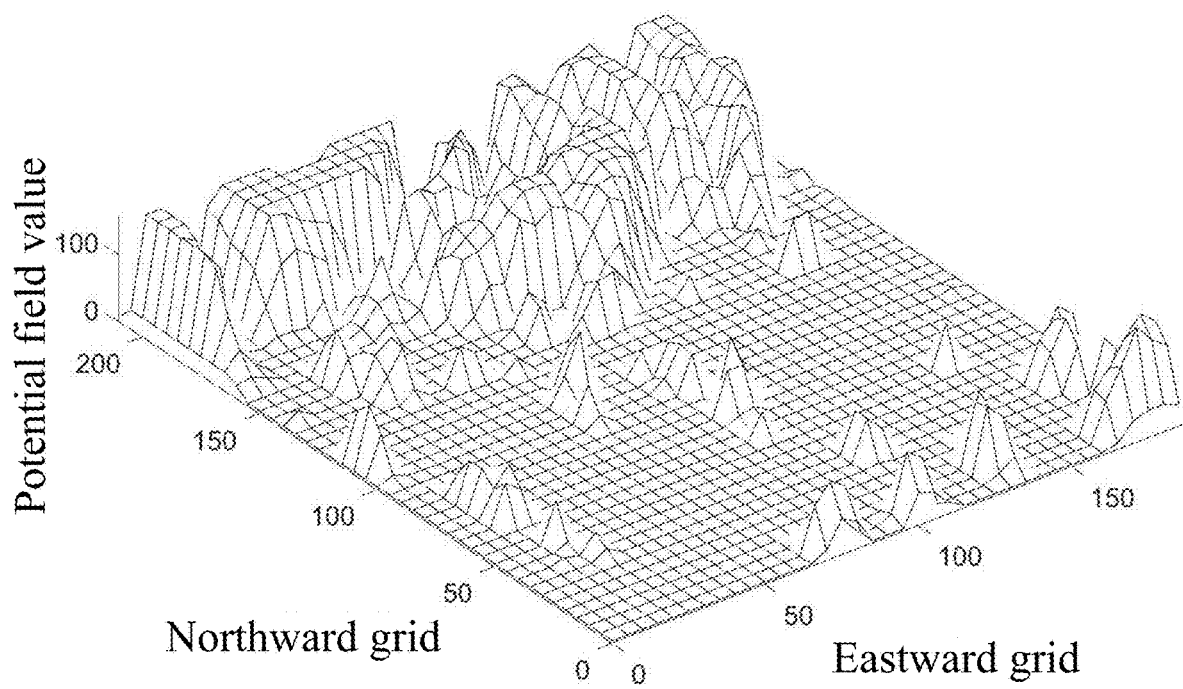
FIG. 6 is a schematic structural diagram of a repulsive potential field.

A total potential field is a sum of repulsive potential fields of all obstacles. A is an obstacle potential field coefficient, σ is an influence range coefficient, and $d(X, X_0)$ is a distance between the vehicle and the obstacle. Regions with a mean square deviation of elevation greater than 2.5 are considered rugged terrain for calculating the repulsive potential field, and the established repulsive potential field is as shown in FIG. 6.

The total potential field U(i) at grid i in the map is:

$$U(i) = \sum_{i=1}^{n} U_{rep}(i) U_{rep}(i)$$

represents the potential field generated by obstacles around grid i.

By combining the grid slope, different set traversal cost values, and the total potential field established above, the cost function of Theta* algorithm is set as follows: $f(n)=\alpha \cdot g(n)+\beta \cdot h(n)+\gamma \cdot U(n)$. $f(n)$ represents the total cost; g(n) is an actual cost from the start point to the current point; h(n) is an estimated cost from the current point to the target point calculated using the Manhattan distance; U(n) is the potential field value of current point; α, β, and γ are the weight coefficients for each cost factor.

The calculation formulas for g(n) and h(n) are:

$$g(n') = g(n) + \sum_{i=1}^{k} \left(\text{pass}_i \cdot d_i \sqrt{1 + S_i^2}\right)$$

and $$h(n) = \sqrt{(n_x - \text{goal}_x)^2 + (n_y - \text{goal}_y)^2} \cdot n$$

is the current node; n' is an expanded child node of node n; $\text{pass}_i$ is a traversal cost of the grid corresponding to the expanded node; $d_i$ is a distance between grids, and $S_i$ is the slope of the grid. $n_x$ and $n_y$ are the coordinates of node n, and $\text{goal}_x$ and $\text{goal}_y$ are the coordinates of the target point.

Considering the vertical travel distance, slope is introduced to represent the actual travel distance of the vehicle. During expansion to the neighboring node, k is set to 1, and the traversal cost and slope of the expanded child node are calculated. When Theta* algorithm is used to calculate the cost between the parent node of the current node n and n', k represents the number of points passed through by the line connecting the two nodes, and the traversal cost of passing through these points is calculated.

S108: Search for paths using a Bresenham's line algorithm and Theta* algorithm based on the rugged terrain potential field as well as the path costs calculated by the cost function $f(n)$ constructed based on $f(n)=\alpha \cdot g(n)+\beta \cdot h(n)+\gamma \cdot U(n)$, to generate a global path. That is, a path from the start point to the endpoint with a minimum total cost (where the total cost is a sum of path costs) is searched for in the global grid map.

S108 specifically includes the following steps: SL: Calculate the slope based on the DEM, to initialize a slope table; calculate a repulsive potential field based on the land surface relief, to initialize a Rep table; initialize a pass table based on the satellite remote sensing image; initialize grid status based on the ground type and the slope; initialize Openlist and Closelist, set a start point and a target point, and add the start point to the Openlist;

S2: Check whether the Openlist is empty; if the Openlist is empty, stop running; otherwise, start pathfinding; and select a point with a minimum cost value currently in the Openlist as an expanded node.

S3: Check whether a current expanded node n is the target point; if yes, finish pathfinding, backtracking parent nodes of the node n, store the backtracked nodes into a path table sequentially to generate a path, until the start point is reached; otherwise, expand to 8 neighboring nodes surrounding the node n, remove the node n from the Openlist, and add the node n to the Closelist.

S4: During expansion to a neighboring node n', first check whether the grid status of the neighboring node n' is free or obstacle; if the grid status is obstacle, skip the neighboring node n', and if the grid status is free, proceed to S5.

S5: Check whether the neighboring node n' is in the Closelist; if yes, perform no operation; otherwise, calculate a cost value from the node n to the neighboring node n' and set the node n as a parent node of the neighboring node n'; calculate a cost value between the neighboring node n' and a parent node of the node n, and if the cost value between the neighboring node n' and the parent node of the node n is smaller than a cost value between the parent node of the node n and the node n plus a cost value between the neighboring node n' and the node n, update a cost value of the neighboring node n' and set a parent node of the neighboring node n' as the parent node of the node n; then check whether the neighboring node n' is in the Openlist; if not, add the neighboring node n' to the Closelist; if the neighboring node n' is in the Openlist, compare a previous cost value of the neighboring node n' with a newly calculated cost value; if the newly calculated cost value is smaller, update the cost value of the neighboring node n'; otherwise, perform no operation; and then return to S2.

Corresponding to the foregoing method, the present disclosure further provides a system for global path planning for an unmanned vehicle in an off-road environment, including: a data obtaining module configured to obtain satellite elevation data and a satellite remote sensing image of a current off-road environment;
- a DEM construction module configured to construct a DEM based on the satellite elevation data;
- a slope and land surface relief determining module configured to determine slope and land surface relief of each grid in the current off-road environment based on the digital elevation model;
- a gray processing module configured to perform gray processing on the satellite remote sensing image to obtain grayscale values of the grids;
- a traversal cost determining module configured to determine traversal costs of the grids corresponding to different ground types based on the grayscale values of the grids;
- a global grid map constructing module configured to construct a global grid map based on the slope and the land surface relief of each grid, as well as the traversal costs corresponding to the different ground types;
- a rugged terrain potential field and path costs determining module configured to determine a rugged terrain potential field and path costs based on the global grid map; and
- a global path generating module configured to search for paths using a Bresenham's line algorithm and Theta* algorithm based on the rugged terrain potential field and the path costs, to generate a global path.

To perform the method corresponding to the foregoing embodiment and implement the corresponding functions and technical effects, the present disclosure further provides a device for global path planning for an unmanned vehicle in an off-road environment. The device includes at least one processor, at least one memory, and computer program instructions stored in the memory, where when the computer program instructions are executed by the processor, the method is implemented. The memory is a computer-readable storage medium.

Based on such description, the technical solutions of the present disclosure essentially or the part contributing to the prior art may be implemented in a form of a software product. The computer software product is stored in a storage medium, and includes several instructions for enabling a computer device (which may be a personal computer, a server, a network device, or the like) to perform all or some steps of the methods described in the embodiments of the present disclosure. The foregoing computer storage medium includes any medium that can store program code, such as a USB flash drive, a removable hard disk, a read-only memory, a random access memory, a magnetic disk, or an optical disc.

Figure 7:
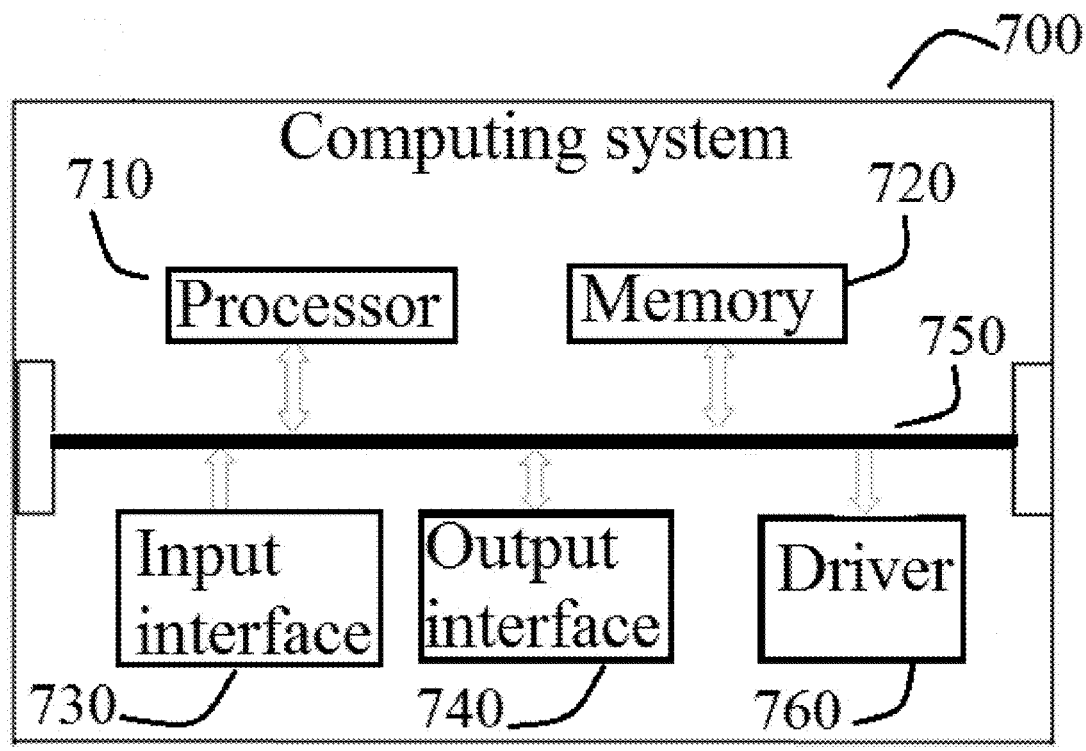
FIG. 7 is a schematic diagram of a computing system 700 according to embodiments of the present disclosure.

FIG. 7 is a schematic diagram of a computing system 700 according to embodiments of the present disclosure. Specifically, FIG. 7 illustrates a schematic diagram of a computing system 700 configured to perform the method for global path planning for an unmanned vehicle in an off-road environment discussed herein.

As shown in FIG. 7, the computing system 700 includes a processor 710, a memory 720, an input interface 730, an output interface 740, a communicate bus 750 and a driver 760 of an unmanned vehicle. The processor 710, the memory 720, the input interface 730, the output interface 740 and the driver 760 via the communicate bus 750. The memory 720 is configured to store programs, instructions, or code, such as programs, instructions, or code for performing the method or step discussed herein. The input interface 730 is configured to receive a satellite elevation data and a satellite remote sensing image of a current off-road environment and send them to the processor 710 via the communicate bus 750. The processor is configured to execute programs, instructions, or code stored in memory 320 in order to accomplish the operation of the various modules or steps discussed herein, and finally generate a global path. The output interface is configured to output the global path and transmit it to the driver 760 of the unmanned vehicle. The driver 760 is configured to control the unmanned vehicle to drive in the off-road environment based on the global path.

Each embodiment in the description is described in a progressive mode, each embodiment focuses on differences from other embodiments, and references can be made to each other for the same and similar parts between embodiments. Since the system disclosed in an embodiment corresponds to the method disclosed in an embodiment, the description is relatively simple, and for related contents, references can be made to the description of the method.

Particular examples are used herein for illustration of principles and implementation modes of the present disclosure. The descriptions of the above embodiments are merely used for assisting in understanding the method of the present disclosure and its core ideas. In addition, those of ordinary skill in the art can make various modifications in terms of particular implementation modes and the scope of application in accordance with the ideas of the present disclosure. In conclusion, the content of the description shall not be construed as limitations to the present disclosure.

What is claimed is:

1. A method for global path planning for an unmanned vehicle in an off-road environment, comprising:
    obtaining satellite elevation data and a satellite remote sensing image of a current off-road environment;
    constructing a digital elevation model (DEM) based on the satellite elevation data;
    determining slope and land surface relief of each grid in the current off-road environment based on the DEM;
    performing gray processing on the satellite remote sensing image to obtain grayscale values of the grids;
    determining traversal costs of the grids corresponding to different ground types based on the grayscale values of the grids;
    constructing a global grid map based on the slope and the land surface relief of each grid, as well as the traversal costs corresponding to the different ground types;
    determining a rugged terrain potential field and path costs based on the global grid map; and searching for paths using a Bresenham's line algorithm and Theta* algorithm based on the rugged terrain potential field and the path costs, to generate a global path;

wherein said searching for paths using the Bresenham's line algorithm and Theta* algorithm based on the rugged terrain potential field and the path costs, to generate the global path comprises:

S1: calculating the slope based on the DEM, to initialize a slope table; calculating a repulsive potential field based on the land surface relief, to initialize a Rep table; initializing a pass table based on the satellite remote sensing image; initializing grid status based on the ground type and the slope; initializing Openlist and Closelist, setting a start point and a target point, and adding the start point to the Openlist;

S2: checking whether the Openlist is empty; if the Openlist is empty, stopping running; otherwise, starting pathfinding; and selecting a point with a minimum cost value currently in the Openlist as an expanded node;

S3: checking whether a current expanded node n is the target point; if yes, finishing pathfinding, backtracking parent nodes of the node n, storing the backtracked nodes into a path table sequentially to generate a path, until the start point is reached; otherwise, expanding to 8 neighboring nodes surrounding the node n, removing the node n from the Openlist, and adding the node n to the Closelist;

S4: during expansion to a neighboring node n', first checking whether the grid status of the neighboring node n' is free or obstacle; if the grid status is obstacle, skipping the neighboring node n', and if the grid status is free, proceeding to S5; and S5: checking whether the neighboring node n' is in the Closelist; if yes, performing no operation; otherwise, calculating a cost value from the node n to the neighboring node n' and setting the node n as a parent node of the neighboring node n'; calculating a cost value between the neighboring node n' and a parent node of the node n, and if the cost value between the neighboring node n' and the parent node of the node n is smaller than a cost value between the parent node of the node n and the node n plus a cost value between the neighboring node n' and the node n, updating a cost value of the neighboring node n' and setting a parent node of the neighboring node n' as the parent node of the node n; then checking whether the neighboring node n' is in the Openlist; if not, adding the neighboring node n' to the Closelist; if the neighboring node n' is in the Openlist, comparing a previous cost value of the neighboring node n' with a newly calculated cost value; if the newly calculated cost value is smaller, updating the cost value of the neighboring node n'; otherwise, performing no operation; and then returning to S2.

2. The method for global path planning for an unmanned vehicle in an off-road environment according to claim 1, wherein said determining the slope and the land surface relief of each grid in the current off-road environment based on the DEM comprises:

determining the slope of each grid in the current off-road environment using a third-order unweighted difference model;

calculating a mean square deviation of elevation in a local area based on the DEM; and determining a mean square deviation of an i-th grid, which serves as land surface relief of the i-th grid, based on the mean square deviation of elevation in the local area as well as an elevation value of the i-th grid.

3. The method for global path planning for an unmanned vehicle in an off-road environment according to claim 1, wherein said performing gray processing on the satellite remote sensing image to obtain the grayscale values of the grids comprises:

obtaining the grayscale values of the grids using an arithmetic mean method based on the satellite remote sensing image.

4. The method for global path planning for an unmanned vehicle in an off-road environment according to claim 1, wherein said determining the traversal costs of the grids corresponding to the different ground types based on the grayscale values of the grids comprises:

determining the traversal costs of the grids corresponding to the different ground types using the following formula:

$$\text{pass}_m = \text{pass}_1 \cdot \frac{v_1}{v_m} (m = 1, 2, 3);$$

wherein pass represents a traversal cost of a grid; m represents a code corresponding to a ground type, with 1, 2, and 3 corresponding to hard soil roads, natural roads, and low mountain roads, respectively; and $v_m$ represents a maneuvering speed of a vehicle on a corresponding ground type.

5. A device for global path planning for an unmanned vehicle in an off-road environment, comprising at least one processor, at least one memory, and computer program instructions stored in the memory, wherein when the computer program instructions are executed by the processor, the processor performs following operations:

obtaining satellite elevation data and a satellite remote sensing image of a current off-road environment;

constructing a digital elevation model (DEM) based on the satellite elevation data;

determining slope and land surface relief of each grid in the current off-road environment based on the DEM;

performing gray processing on the satellite remote sensing image to obtain grayscale values of the grids;

determining traversal costs of the grids corresponding to different ground types based on the grayscale values of the grids;

constructing a global grid map based on the slope and the land surface relief of each grid, as well as the traversal costs corresponding to the different ground types;

determining a rugged terrain potential field and path costs based on the global grid map; and searching for paths using a Bresenham's line algorithm and Theta* algorithm based on the rugged terrain potential field and the path costs, to generate a global path;

wherein said searching for paths using the Bresenham's line algorithm and Theta* algorithm based on the rugged terrain potential field and the path costs, to generate the global path comprises:

S1: calculating the slope based on the DEM, to initialize a slope table; calculating a repulsive potential field based on the land surface relief, to initialize a Rep table; initializing a pass table based on the satellite remote sensing image; initializing grid status based on the ground type and the slope; initializing Openlist and Closelist, setting a start point and a target point, and adding the start point to the Openlist;

S2: checking whether the Openlist is empty; if the Openlist is empty, stopping running; otherwise, starting pathfinding; and selecting a point with a minimum cost value currently in the Openlist as an expanded node;

S3: checking whether a current expanded node n is the target point; if yes, finishing pathfinding, backtracking parent nodes of the node n, storing the backtracked nodes into a path table sequentially to generate a path, until the start point is reached; otherwise, expanding to 8 neighboring nodes surrounding the node n, removing the node n from the Openlist, and adding the node n to the Closelist;

S4: during expansion to a neighboring node n', first checking whether the grid status of the neighboring node n' is free or obstacle; if the grid status is obstacle, skipping the neighboring node n', and if the grid status is free, proceeding to S5; and S5: checking whether the neighboring node n' is in the Closelist; if yes, performing no operation; otherwise, calculating a cost value from the node n to the neighboring node n' and setting the node n as a parent node of the neighboring node n'; calculating a cost value between the neighboring node n' and a parent node of the node n, and if the cost value between the neighboring node n' and the parent node of the node n is smaller than a cost value between the parent node of the node n and the node n plus a cost value between the neighboring node n' and the node n, updating a cost value of the neighboring node n' and setting a parent node of the neighboring node n' as the parent node of the node n; then checking whether the neighboring node n' is in the Openlist; if not, adding the neighboring node n' to the Closelist; if the neighboring node n' is in the Openlist, comparing a previous cost value of the neighboring node n' with a newly calculated cost value; if the newly calculated cost value is smaller, updating the cost value of the neighboring node n'; otherwise, performing no operation; and then returning to S2.

6. The device according to claim 5, wherein said determining the traversal costs of the grids corresponding to the different ground types based on the grayscale values of the grids comprises:

determining the traversal costs of the grids corresponding to the different ground types using the following formula:

$$\text{pass}_m = \text{pass}_1 \cdot \frac{v_1}{v_m} (m = 1, 2, 3);$$

wherein pass represents a traversal cost of a grid; m represents a code corresponding to a ground type, with 1, 2, and 3 corresponding to hard soil roads, natural roads, and low mountain roads, respectively; and $v_m$ represents a maneuvering speed of a vehicle on a corresponding ground type.

7. The device for global path planning for an unmanned vehicle in an off-road environment according to claim 5, wherein the memory is a computer-readable storage medium.

8. The device for global path planning for an unmanned vehicle in an off-road environment according to claim 6, wherein the memory is a computer-readable storage medium.

9. The device according to claim 5, wherein said performing gray processing on the satellite remote sensing image to obtain the grayscale values of the grids comprises:

obtaining the grayscale values of the grids using an arithmetic mean method based on the satellite remote sensing image.

10. The device for global path planning for an unmanned vehicle in an off-road environment according to claim 9, wherein the memory is a computer-readable storage medium.

11. The device according to claim 5, wherein said determining the slope and the land surface relief of each grid in the current off-road environment based on the DEM comprises:

determining the slope of each grid in the current off-road environment using a third-order unweighted difference model;

calculating a mean square deviation of elevation in a local area based on the DEM; and determining a mean square deviation of an i-th grid, which serves as land surface relief of the i-th grid, based on the mean square deviation of elevation in the local area as well as an elevation value of the i-th grid.

12. The device for global path planning for an unmanned vehicle in an off-road environment according to claim 11, wherein the memory is a computer-readable storage medium.

* * * * *